UNITED STATES PATENT OFFICE.

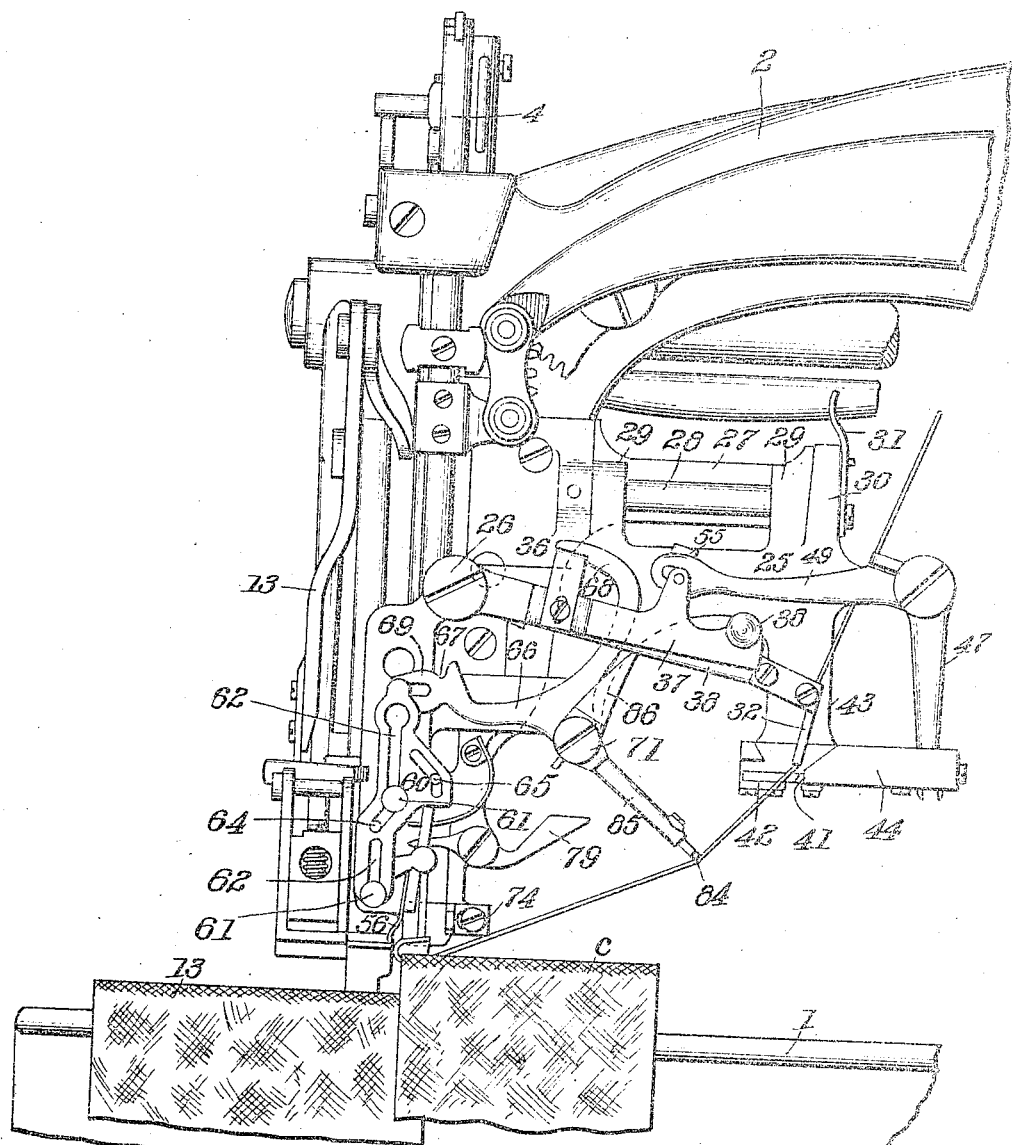

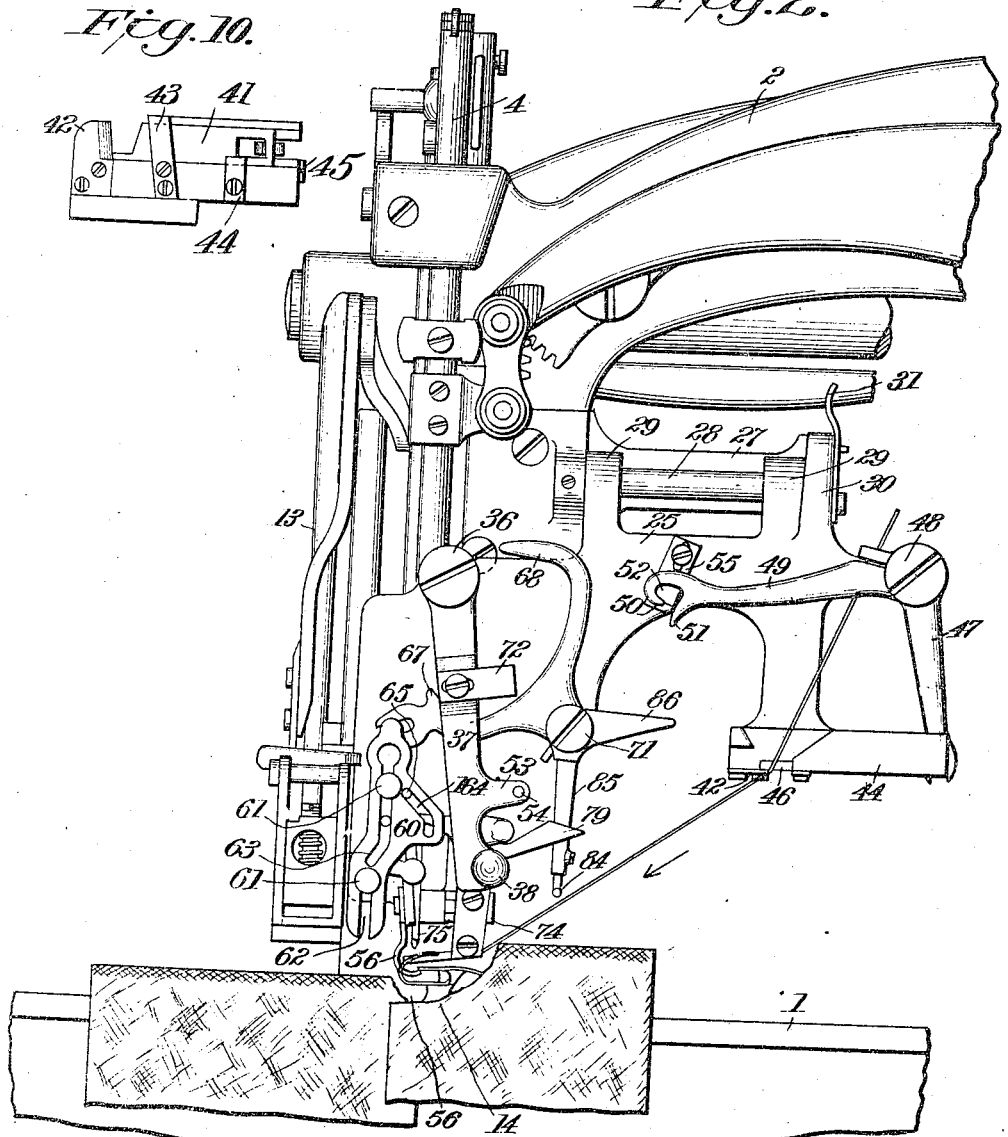

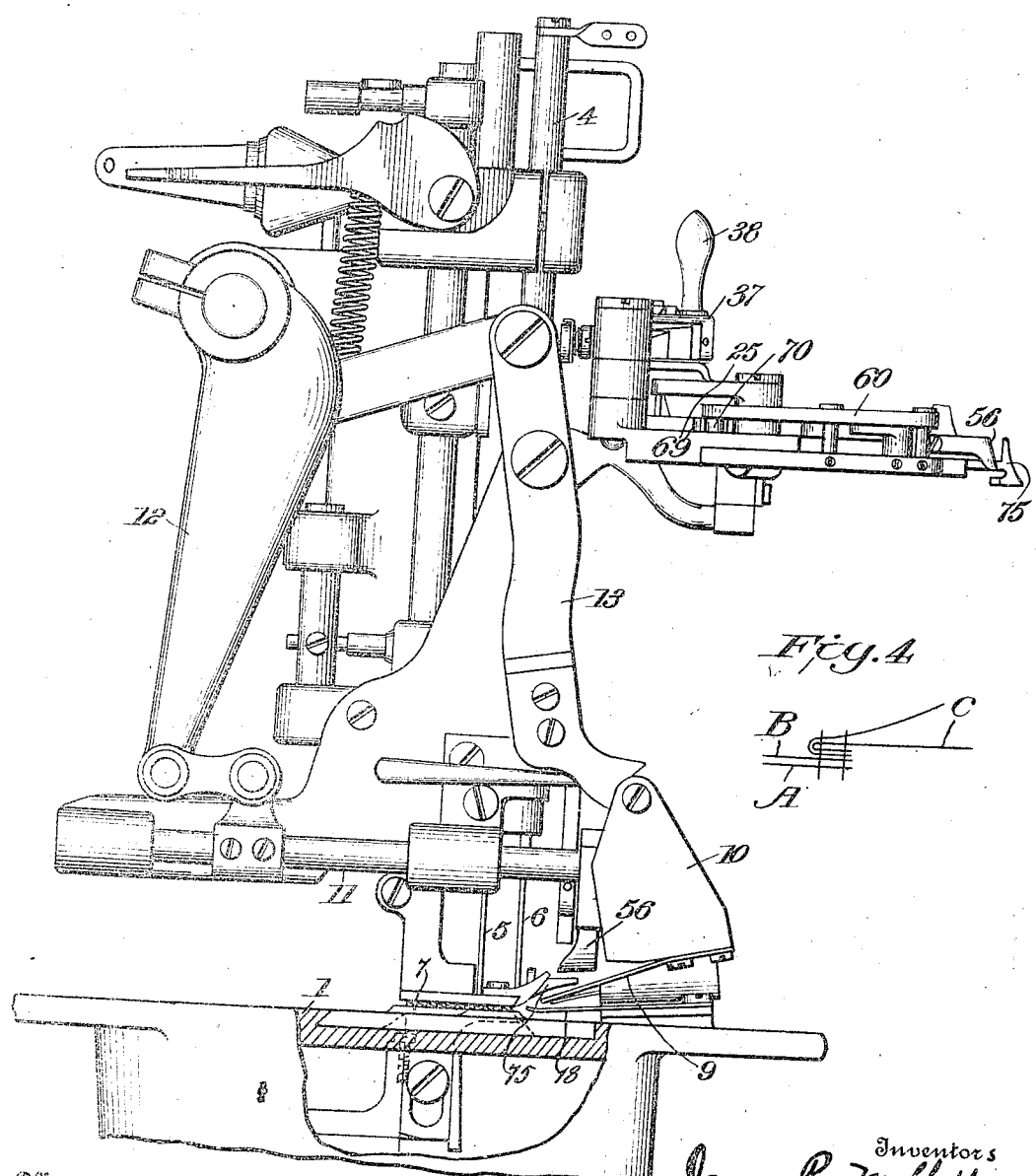

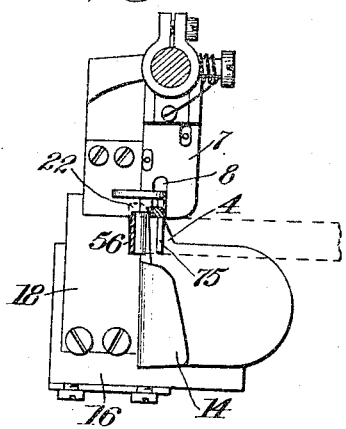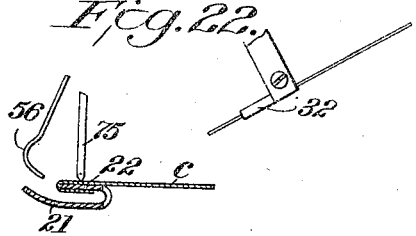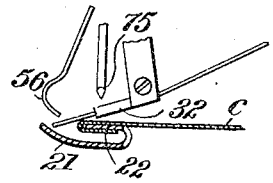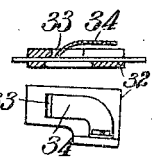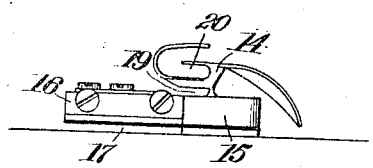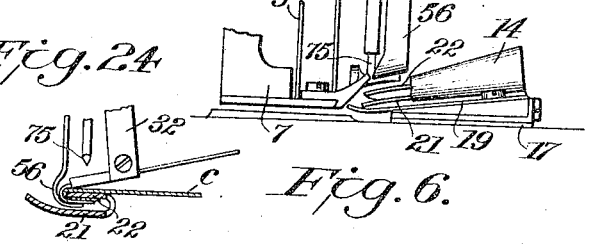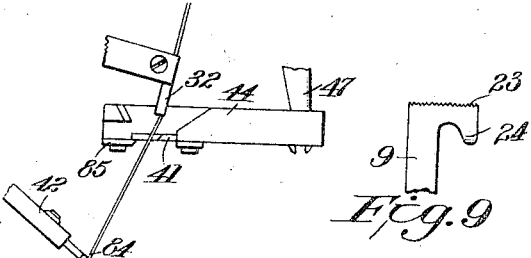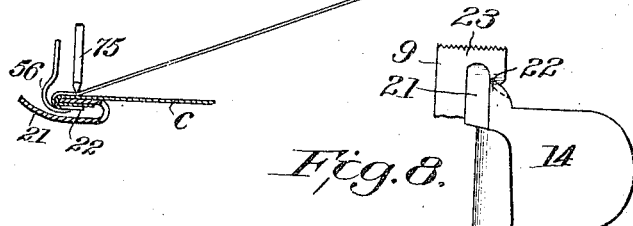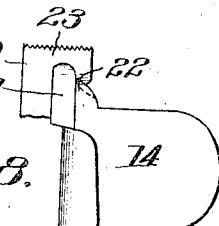

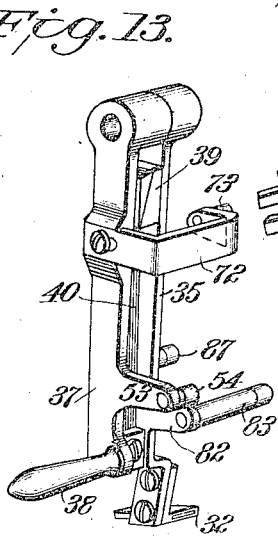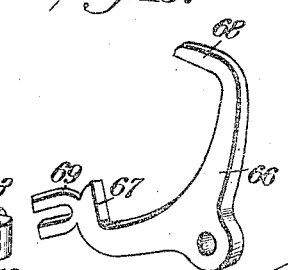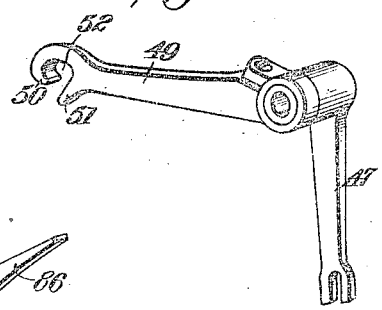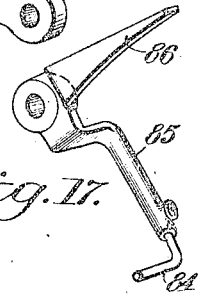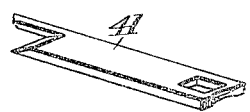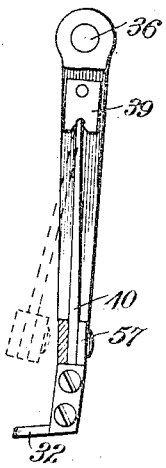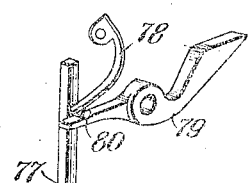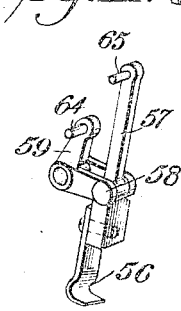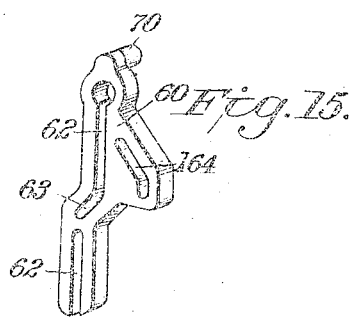

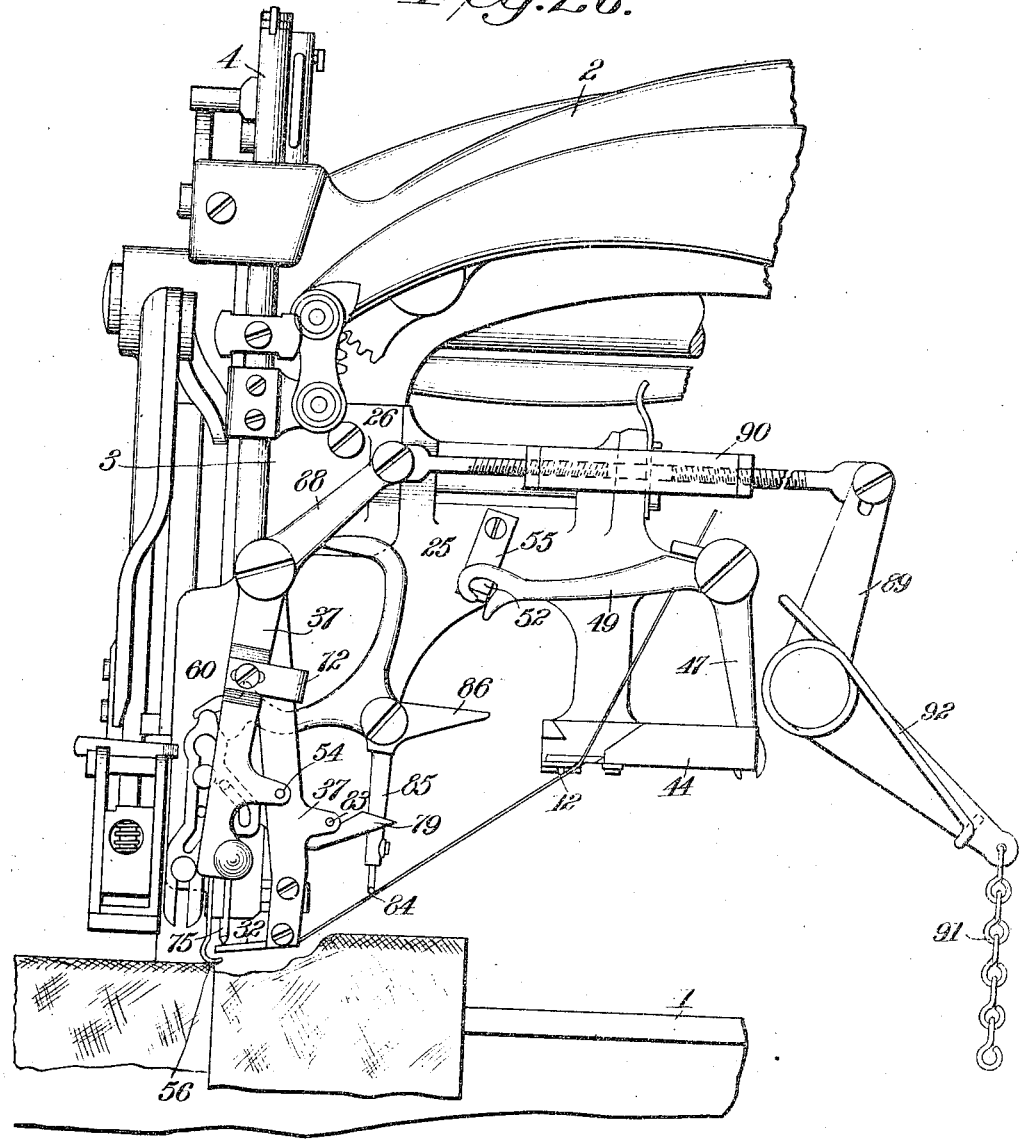

JAMES R. MOFFATT AND RALPH S. KELSO, OF CHICAGO, ILLINOIS, ASSIGNORS TO UNION SPECIAL MACHINE COMPANY, OF CHICAGO, ILLINOIS, A CORPORATION OF ILLINOIS.

SEWING-MACHINE.

1,214,576.

Specification of Letters Patent.  Patented Feb. 6, 1917.

Application filed September 19, 1911. Serial No. 650,123.

*To all whom it may concern:*

Be it known that we, JAMES R. MOFFATT and RALPH S. KELSO, citizens of the United States, residing at Chicago, in the county of Cook, State of Illinois, have invented certain new and useful Improvements in Sewing-Machines, of which the following is a description, reference being had to the accompanying drawing and to the letters and figures of reference marked thereon.

The invention relates to new and useful improvements in sewing machines, and more especially sewing machines for stitching a folded fabric to a body fabric.

An object of the invention is to provide devices for feeding and applying a length of tape to a fabric being stitched, at a point in advance of the stitching mechanism.

A further object of the invention is to provide means for cutting lengths of tape, applying one end thereof to a fabric and tucking or folding the end of the tape underneath the folded edge of the fabric and at a point in advance of the stitching mechanism.

A further object of the invention is to provide means for feeding lengths of tape and applying the same to a fabric being stitched, and to provide means for varying the lengths of the tape being supplied.

These and other objects will in part be obvious, and will in part be hereinafter more fully described.

In the drawings which show by way of illustration one embodiment of the invention, Figure 1 is a front view of the forward end of a sewing machine, having our improvements applied thereto; Fig. 2 is a similar view, showing the tape-feeding device in a different position; Fig. 3 is an end view of the machine, showing the devices for feeding the tape moved away from the stitching mechanism, so that access may be had to the looper or other parts of the stitching mechanism, the cloth plate being broken away to show a part of the feeding mechanism. Fig. 4 is a detail showing a fabric having an edge folded and united to a body fabric, and a tape applied and folded underneath the edge of the folded fabric, by our improved devices; Fig. 5 is a detail view, partly in section, showing in plan the presser foot, the folder, the auxiliary presser member and the movable folding blade for folding the edge of the tape; Fig. 6 is a side view of the same; Fig. 7 is a front end view of the folder; Fig. 8 is a top view of the folder and a portion of the ruffling blade, showing the relative position of the same when the blade is at the forward end of its stroke; Fig. 9 is a detail of the forward end of the ruffler blade; Fig. 10 is a bottom view of the cutting device for severing the tape; Fig. 11 is a top view of the tape carrier; Fig. 12 is a sectional view through the same; Fig. 13 is a detail in perspective, showing the operating device for the tape carrier; Fig. 14 is a detail perspective view of the movable folding finger for the tape; Fig. 15 is a perspective view of the cam plate for operating the folding finger; Fig. 16 is a perspective view of the yoke for operating the cam plate; Fig. 17 is a perspective view of the pull-off finger for the tape; Fig. 18 is a perspective view of the auxiliary presser member and the lever and spring for controlling the same; Fig. 19 is a perspective view of the movable cutter blade; Fig. 20 is a detail perspective view of the rock lever for operating the movable cutter; Fig. 21 is a front view of the tape carrier, showing the spring connection with the operating device therefor; Fig. 22 is a more or less diagrammatic view, showing the tape carrier moved through part of its stroke and supplying the tape; Fig. 23 is a similar view, showing the auxiliary foot raised and a tape carrier at the forward end of its stroke; Fig. 24 is a similar view, showing the folding finger having folded the tape underneath the folded edge of the fabric; Fig. 25 is a similar view, also showing the cutter and the length of tape measured off ready to be cut; Fig. 26 is a view similar to Fig. 2, showing a modified form of operating mechanism for the folding finger.

We have shown our invention as applied to a sewing machine which is equipped with a ruffling device for ruffling a body strip and a folder for folding the edge of the material, which is stitched to the ruffled strip and to a second body fabric. This ruffling device is also provided with mechanism for rendering the same inactive at times, if desired.

Referring to the drawings, the sewing machine consists of a work support 1, an overhanging arm 2, carrying a needle head 3 at its forward end. A needle bar 4 reciprocates in the needle head, and is preferably provided with two needles 5 and 6. A presser bar is also mounted in the needle head and carries a presser foot 7, which may be of the ordinary construction. The presser foot, as herein shown is, however, provided with a slot 8 at its forward end, as shown in Fig. 5. The feeding mechanism is of the usual character and consists of a feed dog F which is mounted on a feed bar and moved back and forth and up and down.

The ruffling blade 9 (see Fig. 3), is carried by a ruffling head 10, mounted on a sliding bar 11 carried by bearings formed in the bracket mounted on the needle head. The bar 11 is reciprocated through a link connection with a rock lever 12. A lever 13 is provided for swinging the ruffler head and lifting the ruffling blade from the material when said ruffling blade is rendered inactive by mechanism controlled by the operator. This ruffling mechanism is of the character shown in the Woodward Patent No. 655,143, dated July 31st, 1900, and will not need further description in this connection.

Mounted on the work support 1 is a folder 14. Said folder consists of a base portion 15, a laterally projecting raised portion 16, which is spaced from the work support to form the guiding groove 17 for a body fabric A. Mounted on the raised portion 16 is a stripper blade 18, over which the fabric B to be ruffled extends, and the edge of the fabric is guided by a groove 19 formed in the folder 15. The third strip of fabric C is led through the folder and the edge thereof is turned by the guiding passage 20 in the folder. The lower wall of the folder 14 extends forwardly and laterally and is slightly bent upwardly to form a curved ledge 21 (see Fig. 8). The intermediate wall of the folder extends forwardly to form a supporting finger or wall 22, the purpose of which will be hereinafter more fully described.

The ruffling blade 9 is provided with a laterally extending part 23 (see Figs. 8 and 9), and also with an extension 24, which forms a continuation of the wall or finger 22 when the ruffling blade is at the forward end of the stroke, as shown in Fig. 8.

In the operation of the above devices, the strip of fabric C is led through the folder 14, with its edge folded underneath and positioned directly above the body fabrics A and B. The ruffler blade engages the fabric B at a point underneath the lower wall of the folder 14, and pressing the same against the stripper blade 18, will ruffle the same. It will thus be seen that the intermediate fabric B may be ruffled at times, if desired, without in any way interfering with the free feeding of the folded strip C, or the body fabric A.

It is found desirable in certain classes of work, to attach short lengths of tape to fabrics folded and stitched, as above described, which lengths of tape extend in a direction at right angles to the line of seam, and one end of the tape is folded about the folded edge of the strip of fabric C. In order that a tape of this character may be quickly applied and properly positioned relative to the fabrics at a point in front of the stitching mechanism, we have provided manually controlled means for feeding and applying the tape. Said manually controlled tape-applying means consists generally of a tape carrier, a cutting mechanism for cutting the measured lengths of tape, a folding or tucking finger for folding the end of the tape underneath the folded edge of fabric, an auxiliary foot for holding the end of the tape in place until carried away by the stitching mechanism, and a pull-off device for determining the length of tape to be applied.

All of these parts are preferably mounted upon a supporting frame 25, which is pivoted to a bracket 26 secured to the needle head. Said bracket carries an outwardly projecting arm 27, and a rod 28 is secured to lugs carried by said arm 27. The swinging frame 25 is formed with ears 29, which are pivotally supported on the rod 28. The purpose of the swinging frame 25 is to allow the various parts of the tape-manipulating device to be swung away from the needle, so as to give access to the looper of the sewing machine or other parts adjacent the stitching mechanism. The swinging frame carries an arm 30, which is held by a spring finger 31 when the frame is swung upward to the position shown in Fig. 3.

*Tape carrier.*—The tape carrier consists of a guiding member 32 which is preferably rectangular in cross section, and is formed with an opening 33 in its upper wall (see Figs. 11 and 12). A pawl 34 extends through the opening 33 and rests against the tape which freely passes through the tape guide 32. This pawl 34 will allow the tape to move freely in one direction through the tape guide, or the tape guide to slide on the tape in the direction of the arrow, Fig. 12, but said pawl will prevent the tape guide from sliding in the opposite direction on the tape, so that when the tape guide is moved in a direction opposite to that indicated by the arrow in this figure, the tape will be carried along with the guide. This tape guide 32 is mounted on an arm 35, which is pivoted at 36 to the swinging frame 25. As a means for moving the tape carrier, we have provided an operating lever 37, which is also pivoted at 36 to the swinging frame. This operating lever 37 is formed, as herein shown, with a handle 38, by which the operating lever may be readily swung. The arm 35 on which the tape carrier is mounted, is provided with a block 39 having a V-shaped notch, (see Fig. 21). The operating lever 37 has a spring 40, rigidly connected thereto, which spring at its outer end engages the V-shaped notch in the block 39. The arm 35 through this spring connection will move with the operating lever 37. The spring connection, however, will allow a further movement of the operating lever, for the purposes hereinafter described.

*Cutting mechanism.*—The cutting mechanism for cutting the lengths of tape, consists of two cutting blades 41 and 42 (see Figs. 10 and 19). The swinging frame 25 is provided with a downwardly projecting arm 43, which is formed with a head 44, in which the movable cutting blade 41 slides. The blade 42 is fixed to the lower face of the head by suitable screws, as shown in Fig. 10. The blade 41 is held in the guiding channel in the head by a fixed finger 43, and a yielding finger 44, which presses against the blade so as to prevent false movements thereof. A screw 45 limits the movement of the blade.

The movable blade 41 is formed with the usual guiding finger 46, which maintains the proper coöperative relation between the blades. Said movable blade is reciprocated back and forth by a rock lever 47, which is pivoted at 48 to the swinging frame 25. Said rock lever carries an arm 49, which is formed with spaced fingers 50 and 51, at its outer end, and a recess 52.

The operating lever 37 carries a projecting arm 53 which is provided with a roller 54. When the operating lever is swung outwardly, or upwardly, the roller 54 will pass between the guiding fingers 50 and 51, into the recess 52, and a further upward movement of the operating lever 37 will swing the rock lever 47 and reciprocate the movable blade 41, so as to cut the tape.

A stop 55 is mounted on the swinging frame 25, and said stop lies in the path of movement of the tape carrier, so that when the tape carrier is moved outwardly and upwardly, it will engage the stop 55 and a further upward movement of the tape carrier be prevented. The operating lever 37, owing to the spring connection with the tape carrier may be moved still farther upward, and thus operate the cutting blades to sever the tape, while the tape carrier is held stationary. This stop 55 is adjustable, and by varying the position of the same, the distance of movement of the tape carrier above the cutting blades, before reaching a position of rest, may be varied, and thus the amount of tape projecting beyond the end of the tape carrier also varied, for the purpose hereinafter described.

*The folding finger.*—When the tape carrier is moved in the direction of the arrow, Fig. 2, a length of tape will be carried down to a position adjacent the folder 14 of the sewing machine, and the end of the tape will project beyond the tape carrier, as above described. In order to fold this projecting end of tape underneath the folded ends of the fabric, we have provided a folding or tucking finger 56. This folding finger 56, as clearly shown in Figs. 2 and 14, is bent outwardly, then downwardly and then laterally, so as to form a curved finger with a substantially horizontally projecting part. The finger 56 is rigidly attached to a bar 57, which is pivoted at 58 to a rock lever 59. The rock lever 59 is in turn pivoted to the swinging frame 25.

In order to properly fold the end of the tape underneath the edge of the fabric, it is necessary to swing the folding finger first outwardly, then downwardly and then inwardly, to carry the same about the supporting ledge for the folded fabric. These movements are imparted to the folding finger through a cam plate 60. Said cam plate 60 is mounted to slide vertically on the swinging frame 25, and is guided by two studs 61, which engage vertical grooves 62 in the cam plate 60. The upper vertical slot 62 is formed with a cam slot 63, which engages a pin 64 carried by the rock lever 59. The cam plate 60 is provided with a second cam groove 164, which engages a pin 65, carried by the bar 57.

When the folding finger is in its extreme upper or inoperative position, the plate 60 is at the upward end of its stroke, as shown in Fig. 1. A downward movement of the plate will cause the pin 64 to move to the right, as viewed in Fig. 1, thus swinging the rock lever 59, which will carry the folding finger downwardly. As the rock lever moves downwardly, the pin 65 will also move downwardly with the same, and thus the bar 57 will be moved substantially in the direction of its length. As soon as the pin 64 reaches the vertical portion of the slot in the plate 60, the rock lever will cease its swinging movement, and the cam slot 164 will move the pin 65 to the left, as viewed in Fig. 1, and thus swing the folding finger 56 to the right, underneath the supporting ledge and carry the end of the tape underneath this ledge.

As a means for moving the cam plate 60, we have provided a yoke 66, which is formed with two arms 67 and 68. The arm

67 carries projecting fingers 69, which engage a roller 70 on the plate 60. The yoke 66 is pivoted at 71 to the swinging frame 25.

The operating lever 37 is formed with a bracket arm 72, which is preferably adjustably attached to said lever. This bracket projects laterally and then rearwardly and again laterally, and carries a roller 73, which is substantially in line with the central axis of the operating lever. The object of the laterally deflected bracket 72 is to provide for a free movement of the lever, relative to the tape carrier, and to position the roller 73 in the rear of the arm on which the tape carrier is mounted. The arm 68 is so disposed relative to the roller 73, that when the tape carrier is moved to the position shown in Fig. 1 and the operating lever 37 is given a further movement to operate the cutter, said roller 73 will engage said arm 68, swing the yoke 66 and lift the cam plate 60. When the tape carrier is moved in the opposite direction by the operating lever 37, the arm 35 will strike an adjustable stop 74, and thus arrest the forward movement of the tape carrier. The operating lever 37 may be moved still further to the left, in view of the yielding connection with the tape carrier. The arm 67 is so disposed relative to the roller 73, that when the lever 37 is given the further additional movement above referred to, said arm will be engaged by the roller, and the plate 60 lowered. The plate 60 may be held in its various positions by any desired means.

*The auxiliary foot.*—In order to properly hold the tape with its end folded about the edge of the fabric, we have provided an auxiliary foot 75, (see Figs. 5 and 18). This auxiliary foot 75 is formed on its under face with a curved surface 76. Said foot is located directly over the supporting finger or ledge 22, (see Figs. 5 and 8). The foot is carried by a bar 77, which slides in a guiding channel in the bracket 25. A spring 78 normally presses said foot downwardly. A lever 79 engages a pin 80 on the bar 77 and by swinging the lever, the auxiliary foot 75 may be raised.

The auxiliary foot is also provided with a laterally extending arm 81. The rear end of the foot extends into the slot 8 in the presser foot, and the arm 81 extends over the presser foot, so that when said presser foot is raised in the usual way, the auxiliary foot 75 will also be raised. This allows for the lifting of the foot when the material is to be inserted into the machine.

In order to lift the auxiliary foot so that the tape may be placed underneath the same, we have formed the arm 35 which supports the tape carrier, with a projecting member 82, which carries a roller 83, (see Fig. 13). The lever 79 is so disposed that when the tape carrier is swung in the direction of the arrow, (Fig. 2), the roller 83 will engage the lever 79, raise the auxiliary foot and hold the same raised, so that the tape may be passed underneath the auxiliary foot. When the tape carrier is swung in the opposite direction, the auxiliary foot will be released, and the spring 78 will move the same into contact with the tape, and properly hold said tape, whereby it may be fed with the fabrics being stitched to the stitching mechanism.

*The pull-off for the tape.*—From the above description, it will be noted that the distance between the folder or line of feed and the cutting device, is constant. In order that different lengths of tapes may be measured and cut, we have provided a pull-off which consists of a tape-engaging finger 84. This tape-engaging finger 84 is carried by an arm 85, pivoted at 71 to the swinging frame 25. A second arm 86 will swing the arm 85.

Mounted on the arm 35 is a roller 87. The arm 86 is so disposed that the roller 87 will engage the lower face thereof when the arm 35 is moved in a direction opposite to the arrow in Fig. 2. The arm 85 is laterally deflected, so as to allow this roller to pass by the arm 85 and engage the arm 86. When the tape carrier is moved along the tape to measure off the length of tape, the pull-off finger 84 will be carried into engagement with the tape, as shown in Fig. 1, and by laterally deflecting the tape, will increase or decrease the length of tape to be cut, according to the position of the pull-off finger 84. This finger 84 is adjustably carried by the arm 85, and thereby the length of tape will be readily varied.

*Operation of the tape-applying device.*—The parts are normally in the position shown in Fig. 1, except the tape is cut and allowed to drop, so that it may be stitched to the fabric. In this position a portion of the tape projects beyond the tape carrier 32, the length of this projecting portion being varied by adjusting the stop 55, so as to determine the throw of the carrier above the cutters.

When it is desired to apply a tape to the material being stitched, the handle 38 is grasped and the carrier swung downward in the direction of the arrow in Fig. 2. The tape will be carried along with the carrier, the roller 83 will engage the lever 79 and lift the auxiliary presser foot, so that tape and carrier may move underneath the same, as shown in Fig. 23. The tape carrier now engages the stop 74, and a further movement thereof is prevented. In this position, the tape projects beyond the edge of the folded fabric, and the supporting ledge therefor, as shown in Fig. 23. A further movement of the operating lever will swing the yoke 66, lower the cam plate 60, and cause the folding finger to engage the end of the tape and bear the same down against the ledge 21 and turn the end of the tape underneath the folded edge of the fabric, as shown in Fig. 24. The operator then swings the operating lever in the opposite direction, which causes the tape carrier to slide along the tape. The lever 79 will be released, and the auxiliary foot will be lowered, through the action of the spring, on to the tape and hold the same in proper position against the upper face of the folded strip of fabric.

As the tape carrier moves outward and upwardly, the pull-off finger will be brought into engagement with the tape and deflect the same, so as to determine the length of the tape which is to be severed. When the carrier strikes the stop 75, a further upward movement of the operating lever 37 will sever the tape.

By adjusting the stop 74 we are able to vary the position of the carrier relative to the folding finger, and thus adjust the distance which the tape extending beyond the tape carrier may be passed to the right of the top fold of the material or fabric which is to be stitched. By adjusting the stop 55 we may adjust the distance which the tape extends beyond the tape carrier, and thus provide a means for varying the amount of tape which is folded around the edge of the folded fabric.

In Fig. 26, we have shown a modified form of means for moving the operating lever. In this figure, the operating lever is shown as provided with a second arm 88, which is rigidly connected to the operating lever 37. This arm 88 is connected to a rock lever 89 by an adjustable link 90. The rock lever 89 is connected by a chain or other flexible connection 91, to a suitable treadle. A spring 92 may be provided for normally holding the treadle raised and the operating lever 37 in the position shown in Fig. 1.

While we have shown our device as applied to a machine equipped with a ruffler and with a folder, it is obvious from certain aspects of the invention, that the tape-feeding and applying devices may be used in connection with other types of sewing machines, or in any place where it is desired to supply lengths of tape or the equivalent thereof. It is also obvious that various changes in the arrangement of parts and the details of construction may be made, without departing from the spirit of our invention, as set forth in the appended claims.

Having thus described our invention, what we claim as new and desire to secure by Letters Patent, is:—

1. The combination of stitch-forming mechanism, a feeding mechanism, a fabric support, devices for applying an end of tape to a fabric, including a tape carrier movable at right angles to the line of feed, and manual means for moving said tape carrier to and position the tape relative to the fabric and the stitch-forming mechanism, said manual means including an operating lever yieldingly connected to the tape-carrier.

2. The combination of stitch-forming mechanism, a fabric support and devices for applying an end of tape to a fabric, including a tape carrier, a cutting device, manually-controlled means including an operating lever yieldingly connected to the tape-carrier for positioning the tape relative to the fabric and stitch-forming mechanism and the cutting device, and devices controlled by said means for subsequently operating the cutting device.

3. The combination of stitch-forming mechanism, a fabric support, feeding mechanism and devices for applying an end of tape to a fabric, including a tape carrier, manually-controlled means for moving said tape carrier in a direction substantially at right angles to the line of feed to position the tape relative to the fabric and stitch-forming mechanism, a folding finger for subsequently folding under the end of the tape, and means for operating said folding finger.

4. The combination of stitch-forming mechanism, a fabric support, feeding mechanism and devices for applying an end of tape to a fabric, including a tape carrier, manually-controlled means for moving said tape carrier in a direction substantially at right angles to the line of feed to position the tape relative to the fabric and stitch-forming mechanism, a folding finger for subsequently folding under the end of the tape, and devices controlled by said means for operating said folding finger.

5. The combination of stitch forming mechanism, a fabric support, devices for applying a section of tape to the line of stitching including a tape guide, a folding finger for folding under the forward end of the tape, and manually controlled means for moving said tape guide toward the stitch forming mechanism for presenting an end of tape thereto and for subsequently moving the folding finger to fold the end of the tape.

6. The combination of stitch-forming mechanism, a fabric support, feeding mechanism, devices for applying a section of tape to the line of stitching, including a tape guide movable in a direction substantially at right angles to the line of feed, a folding finger, a cutting mechanism, and manually controlled devices for operating the tape carrier, the folding finger and the cutting devices in succession.

7. The combination of stitch forming mechanism, a fabric support, devices for applying a section of tape to the line of stitching including a tape carrier, means for moving said tape carrier toward and from the stitch forming mechanism, a folding finger, means for operating the folding finger while the tape carrier is at the forward end of its stroke for turning underneath the end of the tape, cutting devices, and means for operating the cutting devices to sever a length of tape after the tape carrier has moved to the rear end of its stroke.

8. The combination of stitch forming mechanism, a fabric support, devices for applying a section of tape to the line of stitching including a tape carrier, means for moving said tape carrier toward and from the stitch forming mechanism, a folding finger, means for operating the folding finger for turning underneath the end of the tape, cutting devices, means for operating the cutting devices to sever a length of tape after the tape carrier has moved to the rear end of its stroke, and means for regulating the length of the tape.

9. The combination of stitch-forming mechanism, a fabric support, devices for applying a section of tape to the fabric including a tape carrier, an operating lever having a yielding connection with said carrier, a stop for limiting the upward movement of the tape carrier, a cutting device, and devices operated by the movement of said lever relative to the carrier for operating said cutting device.

10. The combination of stitch-forming mechanism, a fabric support, devices for applying a section of tape to the fabric including a tape carrier, an operating lever having a yielding connection with said tape carrier, an adjustable stop for limiting the upward movement of the tape carrier, a cutting device, and devices operated by the movement of said lever relative to the carrier for operating said cutting device.

11. The combination of stitch-forming mechanism, a fabric support, devices for applying a section of tape to the fabric including a tape carrier, an operating lever having a yielding connection with the tape carrier, a stop for limiting the downward movement of the tape carrier, a folding finger for folding underneath the end of the tape, and devices operated by the movement of the lever relative to the carrier for operating said folding finger.

12. The combination of stitch-forming mechanism, a fabric support, devices for applying a section of tape to the fabric including a tape carrier, an operating lever having a yielding connection with the tape carrier, an adjustable stop for limiting the downward movement of the tape carrier, a folding finger for folding underneath the end of the tape, and devices operated by the movement of the lever relative to the carrier for operating said folding finger.

13. The combination of a stitch-forming mechanism, a fabric support, devices for applying a section of tape to the fabric including an oscillating tape carrier, an operating lever having yielding connection with said tape carrier, adjustable stops for limiting the movement of said tape carrier, a cutting device located adjacent one end of the path of said tape carrier, a folding finger located adjacent the other end of the path of the tape carrier, and devices controlled by said lever for operating the cutting device, and devices controlled by said lever for operating said folding finger.

14. The combination of a stitch-forming mechanism, a fabric support, devices for applying a section of tape to the fabric including an oscillating tape carrier, an operating lever having yielding connection with said tape carrier, adjustable stops for limiting the movement of said tape carrier, a cutting device located adjacent one end of the path of said tape carrier, a folding finger located adjacent the other end of the path of the tape carrier, and devices controlled by said lever for operating the cutting devices, devices controlled by said lever for operating said folding finger, a pull-off located intermediate the folding finger and said cutting device, and means controlled by the carrier for operating said pull-off.

15. The combination of stitch-forming mechanism, a work support, a fabric support spaced above said work support, a presser foot, an auxiliary presser foot in advance of the main presser foot and engaging the fabric on said fabric support, and devices for applying a tape to the fabric including a tape carrier for positioning a tape to the line of stitching, means for operating the tape carrier, means for raising the auxiliary foot, whereby the tape carrier may be moved underneath the foot, and means for folding the end of the tape underneath the fabric on said support.

16. The combination of stitch-forming mechanism, a work support, a fabric support spaced from said work support, a main presser foot, an auxiliary presser foot in advance of the main foot and engaging the fabric on said support, means for yieldingly pressing said auxiliary foot on the fabric, means for raising said auxiliary foot with the main foot, a tape carrier, means for operating the tape carrier, and devices controlled by said tape carrier operating means for raising said auxiliary foot so that the tape may be inserted underneath the same.

17. The combination of stitch-forming mechanism, a work support, a fabric support spaced from said work support, a main presser foot, an auxiliary presser foot in advance of the main foot and engaging the fabric on said support, means for yieldingly pressing said auxiliary foot the fabric, means for raising said auxiliary foot with the main foot, a tape carrier, means for operating the tape carrier, devices controlled by said tape carrier operating means for raising said auxiliary foot so that the tape may be inserted underneath the same, and a folding finger for engaging and folding the end of the tape underneath the fabric on said support.

18. The combination of stitch-forming mechanism, a work support, a fabric support spaced from said work support, a supporting ledge located between the work support and the fabric support, a main presser foot, an auxiliary presser foot engaging the fabric on said fabric support, devices for placing a section of tape on said fabric with the end projecting to one side of said fabric support, a folding finger for engaging the end of the tape and folding the same between the fabric support and said ledge, and devices for operating said folding finger.

19. The combination of stitch-forming mechanism, a work support, a fabric support spaced from said work support, a supporting ledge located between the work support and the fabric support, a main presser foot, an auxiliary presser foot engaging the fabric on said fabric support, devices for placing a section of tape on said fabric with the end projecting to one side of said fabric support, a folding finger for engaging the end of the tape and folding the same between the fabric support and said ledge, and devices for moving said folding finger downwardly and then laterally underneath the fabric support, whereby the end of the tape is folded underneath said support.

20. The combination of stitch-forming mechanism, a work support, a fabric support spaced from said work support, a supporting ledge located between the work support and the fabric support, a main presser foot, an auxiliary presser foot engaging the fabric on said fabric support, devices for placing a section of tape on said fabric with the end projecting to one side of said fabric support, a folding finger for engaging the end of the tape and folding the same between the fabric support and said ledge, a bar supporting said folding finger, a rock lever supporting said bar, rollers carried by said rock lever and by said bar, and a cam plate having cam slots coöperating with said rollers for moving said folding finger downwardly and then laterally and then laterally in the opposite direction and then upwardly, whereby the folding finger is carried underneath the fabric support and the end of the tape folded between the fabric support and the ledge.

21. The combination of stitch-forming mechanism, devices for guiding a body fabric, a folder for folding a strip of fabric, said folder having a forwardly projecting fabric support, a ruffling blade for operating upon the body fabric, a main presser foot, an auxiliary presser foot engaging the fabric on said fabric support, and devices for laying a section of tape on said fabric support, said tape extending at an angle to the folded edge of the fabric strip, and for folding the end of the tape underneath the edge of the folded material.

22. The combination of stitch-forming mechanism, devices for guiding a body fabric, a folder for folding a strip of fabric, said folder having a forwardly projecting fabric support, a ruffling device for operating upon the body fabric, a main presser foot, an auxiliary presser foot engaging the fabric on said fabric support, devices for laying a section of tape on said fabric support, said tape extending at an angle to the folded edge of the fabric strip and for folding the end of the tape underneath the edge of the folded material, said ruffling device having a portion thereof extending underneath the fabric support, and a rearwardly projecting part forming substantially a continuation of the fabric support when the ruffler device is at the forward end of its stroke.

23. The combination of stitch-forming mechanism, a work support, devices for guiding a body fabric, a ruffler positioned to operate upon said body fabric, a stripper blade on one side of said ruffler, a folder for folding the edge of a strip and positioning the same above the edge of the ruffled body fabric, a main presser foot, said folder having a forwardly projecting fabric support, a separating ledge between said fabric support and said ruffling blade, an auxiliary presser foot engaging the fabric on said fabric support, a tape carrier for laying a tape underneath said auxiliary foot with the end projecting beyond the folded edge of fabric, a folding finger, and devices for causing said folding finger to engage the ends of said tape and fold the same between said fabric support and said separating ledge.

24. The combination of stitch-forming mechanism, a work support, a main presser foot, devices for applying a tape at an angle to the line of stitching, including a tape guide, a folding finger, an auxiliary foot and cutting devices, and a frame on which said tape-applying devices are mounted, means for supporting said frame, whereby the same may be swung to move said devices away from the stitch-forming mechanism, whereby access thereto may be had.

25. The combination of stitch-forming mechanism, a work support, a main presser foot, devices for applying a tape at an angle to the line of stitching including a tape carrier, a folding finger, an auxiliary foot and cutting devices, and a frame on which said tape-applying devices are mounted, means for supporting said frame, whereby the same may be swung to move said devices away from the stitch-forming mechanism, whereby access thereto may be had, a latch for holding said frame in operative position, and a latch for holding said frame in inoperative position.

26. The combination of stitch-forming mechanism, a main presser foot, devices for applying a tape to the fabric at an angle to the line of stitching, said devices including an auxiliary presser foot, means for yieldingly depressing said auxiliary presser foot, said main presser foot having a slot at the forward end thereof, said auxiliary foot extending into said slot and having a laterally projecting arm overlying the main foot, whereby when said main foot is raised said auxiliary foot will be raised.

27. The combination of stitch-forming mechanism, a work support, a fabric support spaced therefrom, a folding finger, manually-controlled means for operating said folding finger including a supporting bar for said finger, a rock shaft supporting said bar, rollers carried by said bar and said rock shaft, a cam plate having cam grooves engaging said rollers, a yoke for reciprocating said cam plate, and an operating lever carrying a roller for engaging first one arm and then the other of said yoke for reciprocating said plate first in one direction and then the other.

28. The combination of stitch-forming mechanism, a fabric support, means for applying a tape to a fabric at an angle to the line of stitching including a tape carrier and a cutting device, said cutting device including a movable blade, a cutter head in which said movable blade slides, a stationary blade, a rock lever for reciprocating said movable blade, and devices for operating said tape carrier and said rock lever in succession, said lever being operated subsequently to said carrier.

29. The combination of stitch-forming mechanism, a fabric support, devices for applying a tape to the fabric at an angle to the line of stitching including a tape carrier, and means for operating the same including an operating lever yieldingly connected to the tape-carrier, said tape carrier comprising a guiding head and a pawl for engaging the tape for preventing the movement of the tape through the guiding head in one direction.

30. In a sewing machine, stitch-forming mechanism, a work support having a stationary projection, a device for laying an end of tape across said projection, and means operating from a point above said projection to a point below it and around which the end of the tape is folded.

31. In a sewing machine, stitch-forming mechanism, a device to deliver an end of tape to the stitch-forming devices, stationary means for supporting said tape, and means acting on the end of said tape for folding it back upon itself, said tape-supporting member projecting toward the stitch-forming mechanism to guide the end of the folded tape.

32. In a sewing machine, stitch-forming mechanism, a work support, a movable tape carrier for delivering an end of tape to the stitch-forming devices, and means to turn the end of said tape, said work support being provided with a projecting tongue extending across the plane of movement of the tape carrier and around which the end of the tape is turned.

33. In a sewing machine, stitch-forming mechanism, means to guide superposed pieces of fabric to the stitch-forming devices, means to deliver the end of tape to the superposed pieces of fabric, and means located between the guide for the superposed fabric and the stitch-forming devices for inserting an end of tape between the overlapping layers of fabric.

34. In a sewing machine, stitch-forming devices, a work support, means for delivering an end of tape to a point in advance of the stitch-forming devices, independent means acting upon said end of tape to turn it in a direction back upon itself, and means to regulate the amount of tape turned back.

35. In a sewing machine, stitch-forming mechanism, a work plate, a folding device mounted above said work plate and having means to fold an edge of fabric back upon itself, a device for delivering an end of tape to said fold in the fabric, means to regulate the length of tape extending beyond said fold, and means to insert said end of tape around said fold and beneath said fold.

36. In combination, a stitch-forming mechanism, a fabric support, a tape guide for delivering an end of tape to the sitch-forming devices, means to regulate the length of the tape in advance of the tape guide, and a severing device to subsequently sever the predetermined length of tape.

37. In a sewing machine, stitch-forming mechanism, a work support, a tape guide for drawing the tape to the stitch-forming mechanism, a movable member operating on said tape, a severing device, means under control of the operator to deliver the tape from the guide and operate the movable member, and automatic means to operate the severing device and restore the parts for the next succeeding operation.

38. In a sewing machine, stitch-forming mechanism, a work support, feeding mechanism, means including a tape-carrier moving in a direction substantially at right angles to the line of feed for delivering an end of tape to the stitch-forming mechanism, said carrier delivering said tape with an end of tape in advance of said carrier, and means to engage the end of said tape and hold it against displacement as the carrier moves back along the tape to its initial position.

39. In a sewing machine, stitch-forming mechanism, a work plate, feeding mechanism, a tape-carrier moving in a direction substantially at right angles to the line of feed delivering an end of tape to stitch-forming devices, means to maintain said end of tape against displacement, said tape-carrier taking up the slack in said tape as it returns to its initial position, and a severing device for said tape while held taut between the carrier and said means to maintain its end.

40. In a sewing machine, stitch-forming mechanism, a work plate, feeding mechanism and tape-carrier moving in a direction substantially at right angles to the line of feed delivering an end of tape to the stitch-forming devices, means to maintain said end of tape against displacement, said tape carrier taking up the slack in said tape as it returns to its initial position, and severing devices to sever said tape while held taut between the carrier and said means to maintain its end, said severing device being located in the space between the end of movement of the tape carrier and means to maintain the end of the tape.

41. In a sewing machine, stitch-forming mechanism, feeding mechanism, a tape-delivering mechanism including a tape-carrier moving in a direction substantially at right angles to the line of feed to deliver a succession of ends of tape to the stitch-forming devices, means to sever successive lengths from the supply of tape, said tape-carrier in one movement pulling tape from the supply and in its opposite movement sliding upon the tape.

42. In a sewing machine, stitch-forming mechanism, feeding mechanism and a presser foot, a device movable substantially at right angles to the line of feed for delivering a tape in front of said presser foot, means to hold said tape, said holding means being raised and lowered with the presser foot.

43. In a sewing machine, stitch-forming mechanism, a work plate, feeding mechanism, a severing device, a support for said severing device, a member movable at right angles to the line of feed for feeding, guiding and delivering an end of tape, said severing device being operated to sever the tape for each forward and backward movement of the feeding, guiding and delivering device.

In testimony whereof we affix our signatures, in presence of two witnesses.

JAMES R. MOFFATT
RALPH S. KELSO.

Witnesses:
 CHESTER McNEIL,
 FRANCIS S. NORTH.